US012115781B2

(12) United States Patent
Asai et al.

(10) Patent No.: US 12,115,781 B2
(45) Date of Patent: Oct. 15, 2024

(54) PRINTING APPARATUS AND CONTROL METHOD WITH CUTTER UNIT CONFIGURED TO CONNECT WITH OR SEPARATE FROM PRINTING UNIT

(71) Applicant: CANON KABUSHIKI KAISHA, Tokyo (JP)

(72) Inventors: Yasuyuki Asai, Tokyo (JP); Hiromasa Yoneyama, Kanagawa (JP); Ryohei Maruyama, Kanagawa (JP); Itaru Wada, Kanagawa (JP); Yoshiaki Suzuki, Chiba (JP); Tomohito Abe, Kanagawa (JP); Tsutomu Obata, Tokyo (JP); Noriyuki Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 17/120,447

(22) Filed: Dec. 14, 2020

(65) Prior Publication Data

US 2021/0197593 A1 Jul. 1, 2021

(30) Foreign Application Priority Data

Dec. 27, 2019 (JP) ................................ 2019-239282

(51) Int. Cl.

*B41J 11/70* (2006.01)
*B26D 1/24* (2006.01)
*B65H 35/06* (2006.01)

(52) U.S. Cl.

CPC ............ *B41J 11/706* (2013.01); *B26D 1/245* (2013.01); *B65H 35/06* (2013.01)

(58) Field of Classification Search

CPC ......... B41J 11/706; B26D 1/245; B65H 35/06
See application file for complete search history.

(56) References Cited

U.S. PATENT DOCUMENTS

| | | | | |
|---|---|---|---|---|
| 3,951,252 | A | 4/1976 | Selke et al. | |
| 5,363,123 | A * | 11/1994 | Petersen | B41J 11/706 346/24 |
| 5,640,232 | A | 6/1997 | Miyake et al. | |
| 6,002,849 | A | 12/1999 | Koh et al. | |
| 6,202,527 | B1 * | 3/2001 | Heller | G03B 27/588 83/614 |

(Continued)

FOREIGN PATENT DOCUMENTS

| | | |
|---|---|---|
| DE | 2343858 A1 | 3/1975 |
| EP | 0579416 A2 | 1/1994 |

(Continued)

OTHER PUBLICATIONS

Search and Examination Report dated May 27, 2021, in Great Britain Patent Application No. 2019409.8.

(Continued)

*Primary Examiner* — Jennifer Bahls
*Assistant Examiner* — Quang X Nguyen
(74) *Attorney, Agent, or Firm* — Venable LLP

(57) ABSTRACT

There is provided a printing apparatus. A printing unit prints an image on a printing medium and is able to move. A cutter unit is able to connect with or separate from the printing unit, and, by following a movement of the printing unit, cuts the printing medium. A setting unit sets, in accordance with a size of the printing medium, a standby position of the cutter unit.

15 Claims, 14 Drawing Sheets

(56) References Cited

U.S. PATENT DOCUMENTS

| | | | | |
|---|---|---|---|---|
| 10,124,609 | B2 | 11/2018 | Kikuchi et al. | |
| 10,286,691 | B2 | 5/2019 | Chino et al. | |
| 2010/0238247 | A1 | 9/2010 | Doo | |
| 2018/0272762 | A1* | 9/2018 | Chino | B65H 35/0086 |
| 2019/0111712 | A1* | 4/2019 | Nonaka | B41J 29/02 |

FOREIGN PATENT DOCUMENTS

| | | | | | |
|---|---|---|---|---|---|
| EP | 0936498 | A1 | | 8/1999 | |
| JP | H11-151896 | A | | 6/1999 | |
| JP | 2003-191549 | A | | 7/2003 | |
| JP | 2003320720 | A | * | 11/2003 | |
| JP | 2005066899 | A | * | 3/2005 | |
| JP | 2005313464 | A | * | 11/2005 | B41J 29/38 |
| JP | 2006-043835 | A | | 2/2006 | |
| JP | 2014-176907 | A | | 9/2014 | |
| JP | 2017-064810 | A | | 4/2017 | |
| JP | 2018-161772 | A | | 10/2018 | |

OTHER PUBLICATIONS

U.S. Appl. No. 17/120,422, filed Dec. 14, 2020 (First Named Inventor: Hiromasa Yoneyama).
U.S. Appl. No. 17/120,645, filed Dec. 14, 2020 (First Named Inventor: Tomohito Abe).
Office Action dated Jul. 20, 2023, in German Patent Application No. 102020007558.4.
Office Action dated Oct. 20, 2023, in Japanese Patent Application No. 2019-239282.

* cited by examiner

PRINTING APPARATUS AND CONTROL METHOD WITH CUTTER UNIT CONFIGURED TO CONNECT WITH OR SEPARATE FROM PRINTING UNIT

BACKGROUND OF THE INVENTION

Field of the Invention

The present invention relates to a printing apparatus and a control method.

Description of the Related Art

In a printing apparatus that performs printing on a long printing medium such as roll paper, cutting of a printing medium after printing may be performed. In Japanese Patent Laid-Open No. 2018-161772, a printing apparatus that performs cutting of a printing medium by connecting a carriage and a cutter unit and then causing the cutter unit to follow the carriage is described.

SUMMARY OF THE INVENTION

According to one embodiment of the present invention, there is provided printing apparatus comprising: a printing unit configured to print an image on a printing medium and that is configured to be able to move; a cutter unit configured to be able to connect with or separate from the printing unit, and configured to, by following a movement of the printing unit, cut the printing medium; and a setting unit configured to set, in accordance with a size of the printing medium, a standby position of the cutter unit.

According to another embodiment of the present invention, there is provided a control method of a printing apparatus that comprises a printing unit configured to print an image on a printing medium and that is configured to be able to move, and a cutter unit configured to be able to connect with or separate from the printing unit, and configured to, by following a movement of the printing unit, cut the printing medium, the method comprising: setting, in accordance with a size of the printing medium, a standby position of the cutter unit.

According to still another embodiment of the present invention, there is provided printing apparatus comprising: a printing unit configured to print an image on a printing medium and that is configured to be able to move; and a cutter unit configured to be able to connect with or separate from the printing unit, and configured to, by following a movement of the printing unit, cut the printing medium, wherein the cutter unit can be placed at a plurality of standby positions.

Further features of the present invention will become apparent from the following description of exemplary embodiments (with reference to the attached drawings).

DESCRIPTION OF THE EMBODIMENTS

In the above conventional technique, after printing of an image to a printing medium is ended, a carriage moves to a home position of a cutter unit and then makes a connection with a cutter unit. Therefore, in a case where printing of images is performed in sequence while cutting the printing medium into pages, the movement distance of the carriage may increase and the throughput of the printing apparatus may suffer.

An embodiment of the present invention provides a technique that improves the throughput of a printing apparatus.

Hereinafter, embodiments will be described in detail with reference to the accompanying drawings. Note, the following embodiments are not intended to limit the scope of the claimed invention. Although several features are described in the embodiments, these features are not all necessarily required for the invention, and multiple features may be combined as desired. Furthermore, in the accompanying drawings, the same or similar configurations are given the same reference signs, and redundant descriptions thereof will be omitted.

Note that "printing" encompasses not only cases where meaningful information such as text and figures are formed but also cases where broadly, an image, a design, a pattern, and the like—irrespective of whether they are meaningful or meaningless—are formed on a printing medium or processing of a medium is performed, and it does not matter whether or not what is formed is a manifestation that can be perceived through vision by a person. Also, although sheet-like paper is envisioned as "printing medium" in the present embodiment, "printing medium" may be fabric, a plastic film, and the like.

First Embodiment

<Overview of Printing Apparatus>

Figure 1:
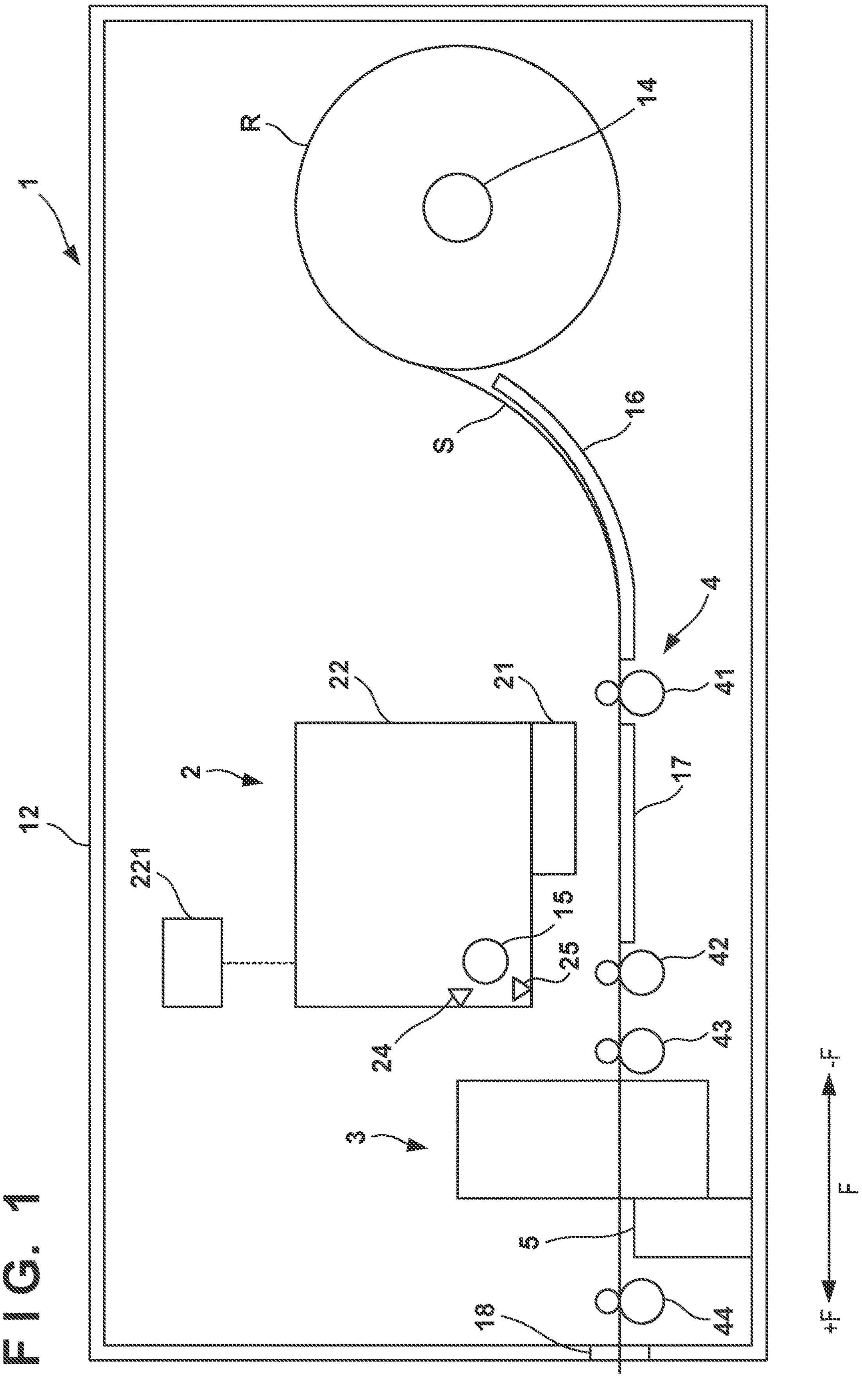
FIG. 1 is a side view that schematically illustrates an internal structure of a printing apparatus according to an embodiment.
Figure 2:
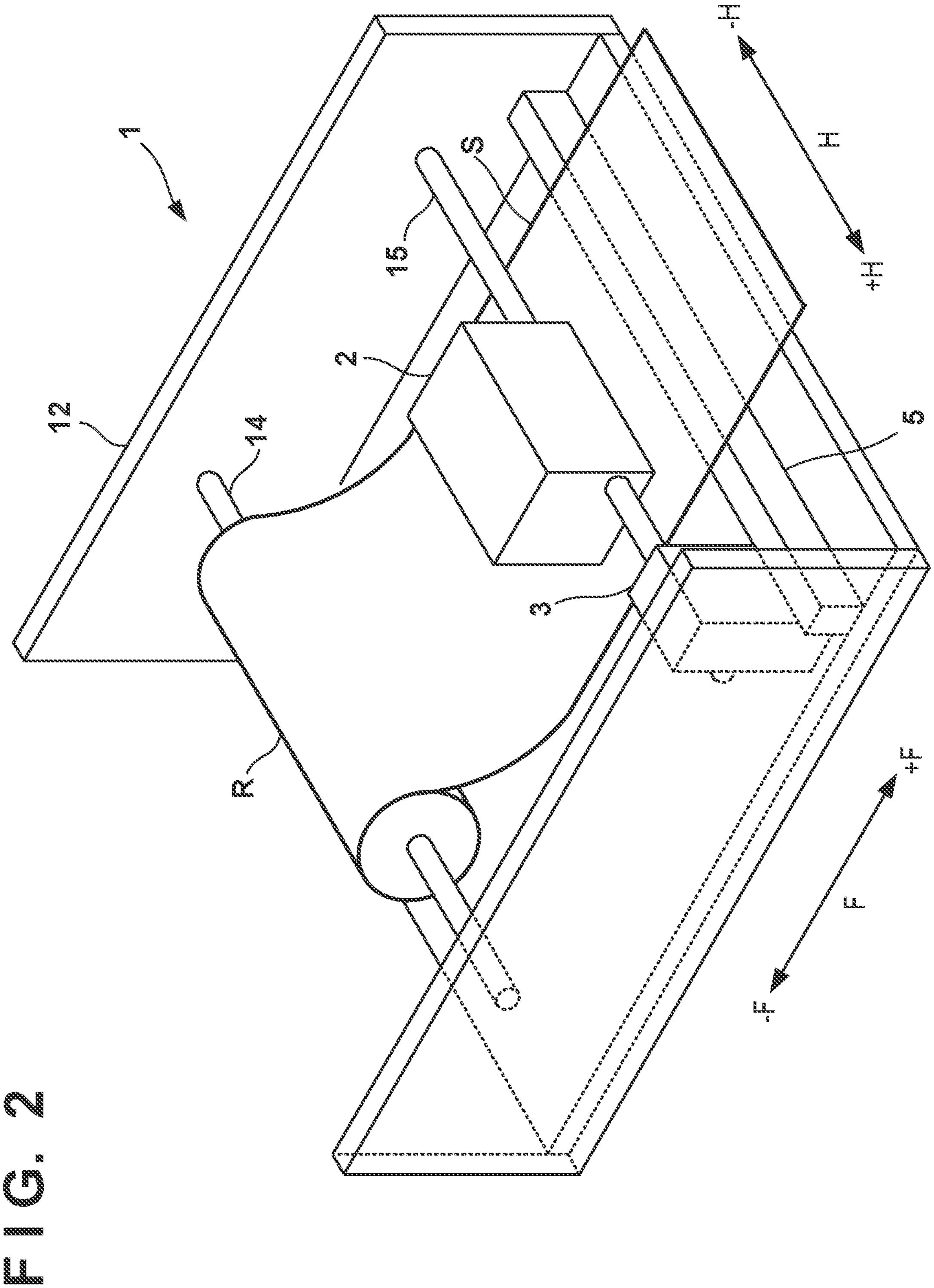
FIG. 2 is a perspective view that schematically illustrates a configuration of the printing apparatus in FIG. 1.

FIG. 1 is a view that schematically illustrates an internal structure of a printing apparatus 1 according to an embodiment. FIG. 2 is a perspective view that schematically illustrates a configuration of the printing apparatus 1 in FIG. 1. Note that in FIG. 1 and FIG. 2, illustration of some of the configurations is omitted. Also, a movement direction of a printing unit 2 will be a main scanning direction H, and a direction that intersects the main scanning direction H will be an auxiliary scanning direction F. Also, for the sake of descriptive convenience, one side in the direction of the main scanning direction H will be referred to as a +H side, and the other, a −H side; and one side in the direction of the auxiliary scanning direction F will be referred to as a +F side, and the other, a −F side.

The printing apparatus 1 is an inkjet printer, and each constituent component is arranged within a housing 12. The printing apparatus 1 pulls out a printing medium S from a roll (roll paper) R which is the wound printing medium S and then prints an image on the printing medium S. The roll R is set so as to be able to rotate on a spool 14. Also, the printing apparatus 1 includes the printing unit 2, a cutter unit 3, and a conveyance unit 4.

The printing unit 2 prints an image on the printing medium S. In the present embodiment, the printing unit 2 has a printhead 21 and a carriage 22 on which the printhead 21 is arranged.

The printhead 21 prints an image by discharging ink on the printing medium S. The ink that the printhead 21 discharges is supplied from an ink tank (not illustrated). The ink tank may be arranged in the carriage 22 or may be arranged somewhere within the housing 12 and supply ink to the printhead 21 by a supply member such as a tube.

The carriage 22 is guided by a guide member 15 and is arranged so as to be able to move back and forth in the main scanning direction H. In the present embodiment, the carriage 22 moves back and forth using a carriage motor 221 as a driving source. The position of the carriage 22 in the main scanning direction H is detected by a sensor (not illustrated). Such a sensor may be configured by, for example, an encoder scale that is arranged to extend in the main scanning direction H and an encoder sensor that is arranged in the carriage 22 and reads the encoder scale.

Figure 14:
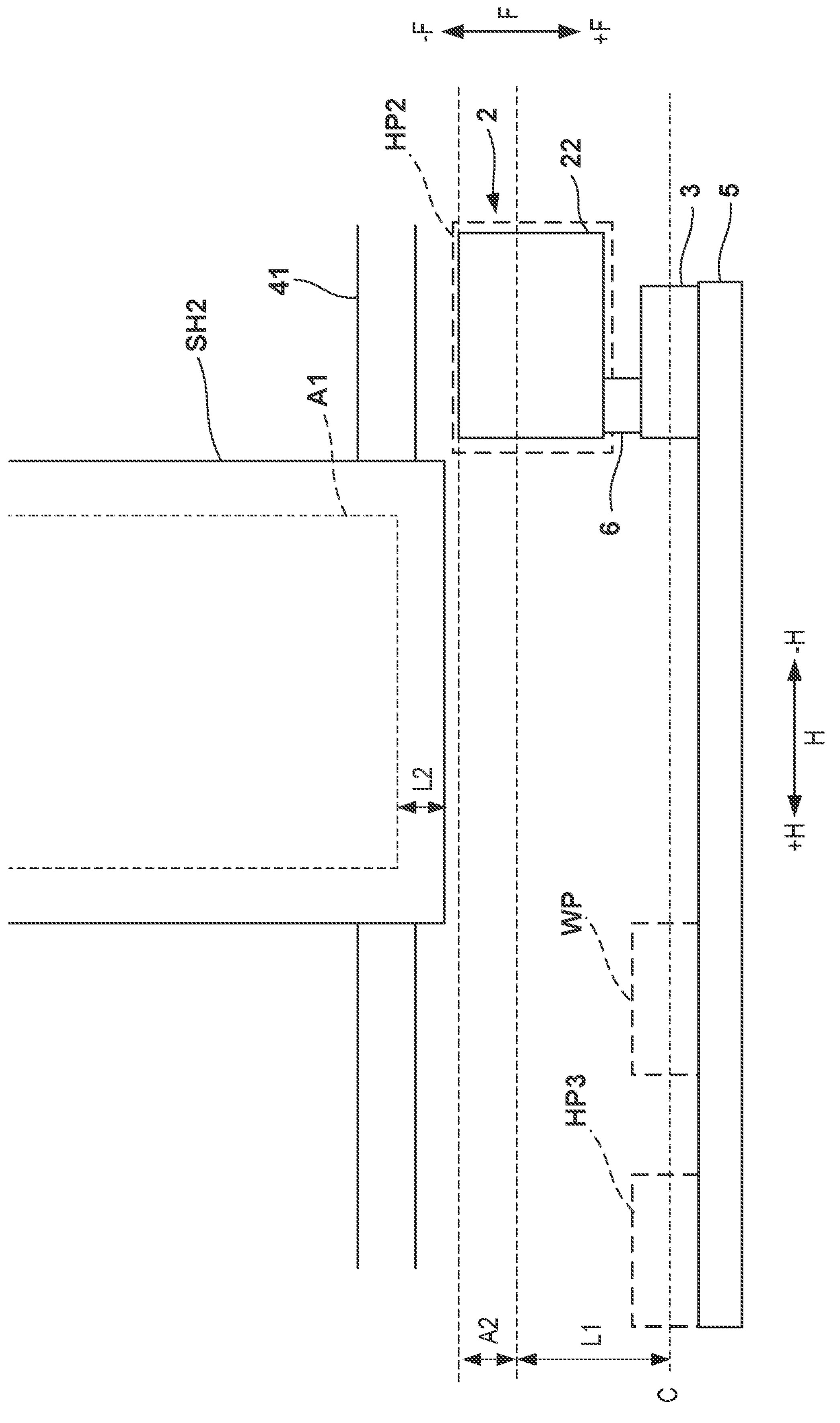
FIG. 14 is a plan view of the printing apparatus according to the embodiment and is a view that illustrates a state in which cutting of a preceding printing medium and cuing of a succeeding printing medium are performed.

Also, in the present embodiment, a home position HP2 of the carriage 22 is arranged at the end of the main scanning direction −H side, which is one end of the movement range of the carriage 22 (refer to FIG. 14). Then, by the printhead 21 discharging ink on the printing medium S while the carriage 22 moves from the home position HP2 in a +H direction, an image is printed on the printing medium S.

Also, in the present embodiment, the printing unit 2 comprises a sensor 24 that detects the presence/absence of the cutter unit 3 and a sensor 25 that detects the edge of a sheet of the printing medium S in the main scanning direction H. The printing apparatus 1 can acquire the width of a sheet of the printing medium S by the sensor 25. As such sensors, light-reflective optical sensors, ultrasonic sensors, and the like, for example, may be used.

The cutter unit 3 is what cuts the printing medium S on which printing was performed by the printing unit 2 and is arranged further on the +F side than the printing unit 2 in the auxiliary scanning direction F, in other words, on the downstream side in the conveyance direction of the printing medium S. The cutter unit 3 is supported by a supporting member 5 so as to be able to move in parallel with the movement direction of the carriage 22, in other words, in the main scanning direction H. In the present embodiment, a home position HP3 of the cutter unit 3 is arranged, in the movement range of the carriage 22, on the opposite end from the end on the side where there is the home position HP2 of the carriage 22. In other words, the home position HP2 of the carriage 22 and the home position HP3 of the cutter unit 3 are arranged apart in the main scanning direction H so as to sandwich the passing region of the printing medium S. Furthermore, they are arranged apart in the main scanning direction H so as to sandwich the passing region of the printing medium S in the maximum size that is supported by the printing apparatus 1.

Also, the cutter unit 3 is arranged so as to be able to connect with or separate from the carriage 22 by a connecting part 6 that is described later and follows the carriage 22 by connecting with the carriage 22 and then cuts the printing medium S. The printing medium S that was cut by the cutter unit 3 is conveyed by a conveyance roller pair 44 that is described later and then is discharged from a discharge port 18.

The conveyance unit 4 conveys the printing medium S that was unwound from the roll R. The conveyance unit 4 conveys the printing medium S following a supporting member 16 and a platen 17, which guide and support the printing medium S, from within the housing 12 to the discharge port 18. In the present embodiment, the conveyance unit 4 includes a plurality of conveyance roller pairs 41 to 44 that are arranged to be apart in the auxiliary scanning direction F. The plurality of the conveyance roller pairs 41 to 44 each include a drive roller that is driven by a conveyance motor (not illustrated) and a driven roller that is driven by the drive roller. Note that the drive rollers may be driven by a single conveyance motor or be separately driven by a plurality of conveyance motors that correspond to the respective drive rollers.

<Hardware Configuration>

Figure 3:
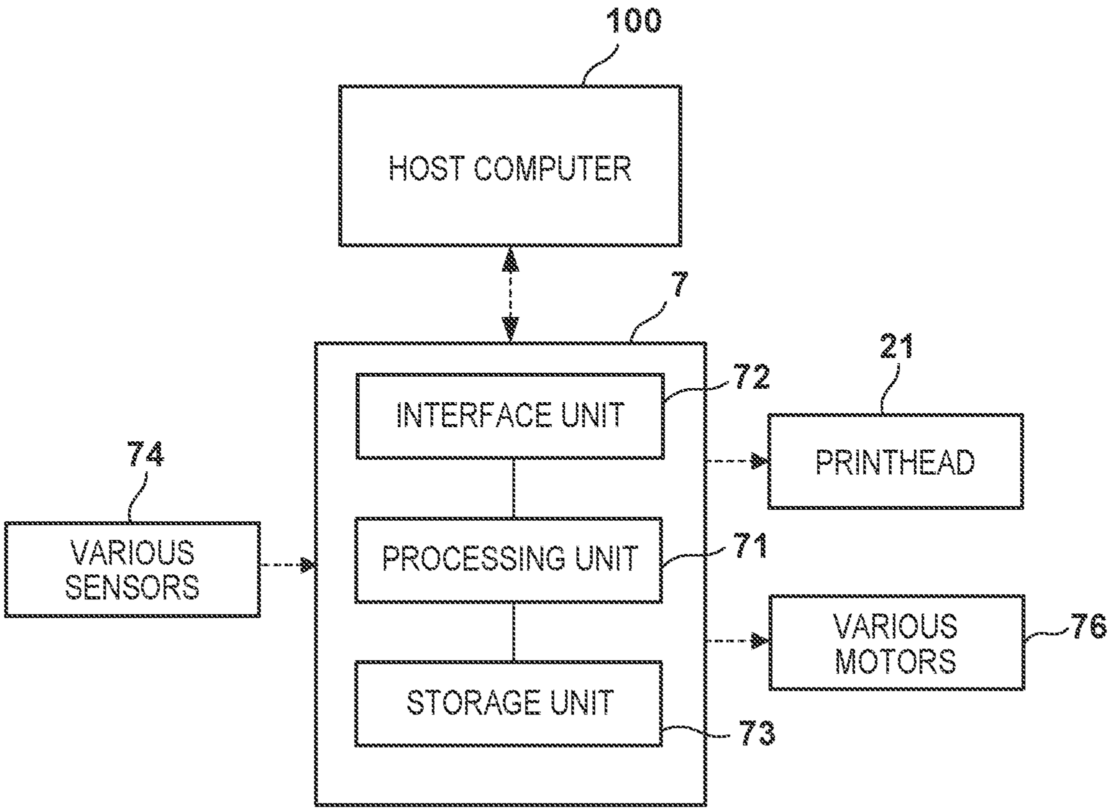
FIG. 3 is a block diagram that illustrates an example of a hardware configuration of the printing apparatus in FIG. 1.

FIG. 3 is a block diagram that illustrates an example of a hardware configuration of the printing apparatus 1. FIG. 3 is a block diagram of a control unit 7 of the printing apparatus 1. The control unit 7 includes a processing unit 71 such as a CPU, an interface unit 72 that performs an exchange of data with an external device, and a storage unit 73 such as a ROM and a RAM. The processing unit 71 reads and then executes a program that is stored in the storage unit 73. In calculation processing that is performed by the processing unit 71, image processing as well as processing for communication with a host computer 100 via the interface unit 72, for example, are included. Also, discharge control, which is performed based on the detection results of various sensors 74, of the printhead 21 comprised by the printing unit 2 and drive control of various motors 76, for example, are included. Among various sensors 74, an encoder sensor for detecting the position of the carriage 22, the sensor 24 for detecting the position of the cutter unit 3, the sensor 25 that detects the edge of the sheet of the printing medium S, and the like are included. Among various motors 76, the carriage motor 221, a conveyance motor (not illustrated), a sheet supplying motor (not illustrated) that rotationally drives the spool 14, and the like are included.

In the storage unit 73, a control program for controlling the printing apparatus 1, data that is necessary for executing the control program, and the like, for example are stored. Also, a configuration may be taken so as to save print data that was transmitted from the host computer 100, for example.

<Configuration of Cutter Unit and Connecting Part>

Figure 4C:
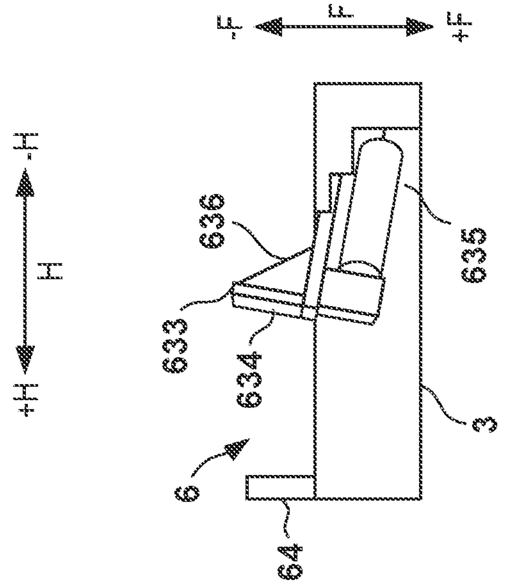
FIG. 4C is a view that illustrates a configuration of a cutter unit and a cutter unit side of a connecting part.
Figure 4B:
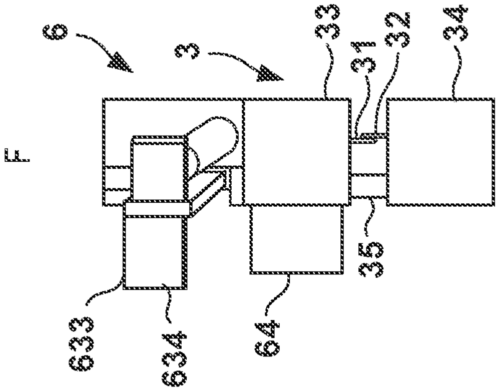
FIG. 4B is a view that illustrates a configuration of a cutter unit and a cutter unit side of a connecting part.
Figure 4A:
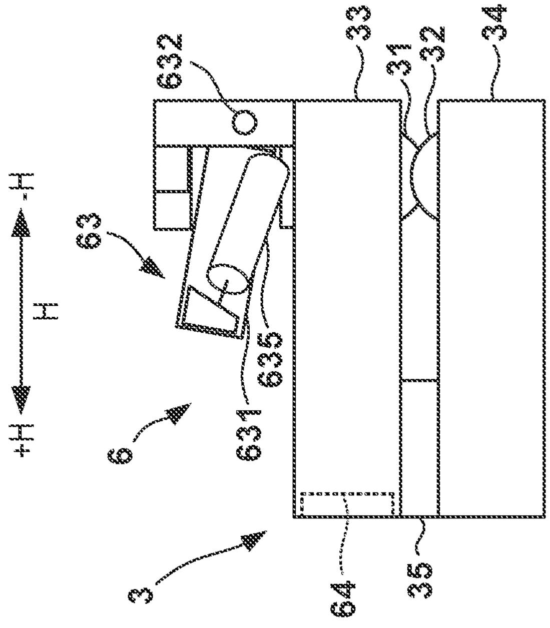
FIG. 4A is a view that illustrates a configuration of a cutter unit and a cutter unit side of a connecting part.
Figures 5A, 5B, 5C:
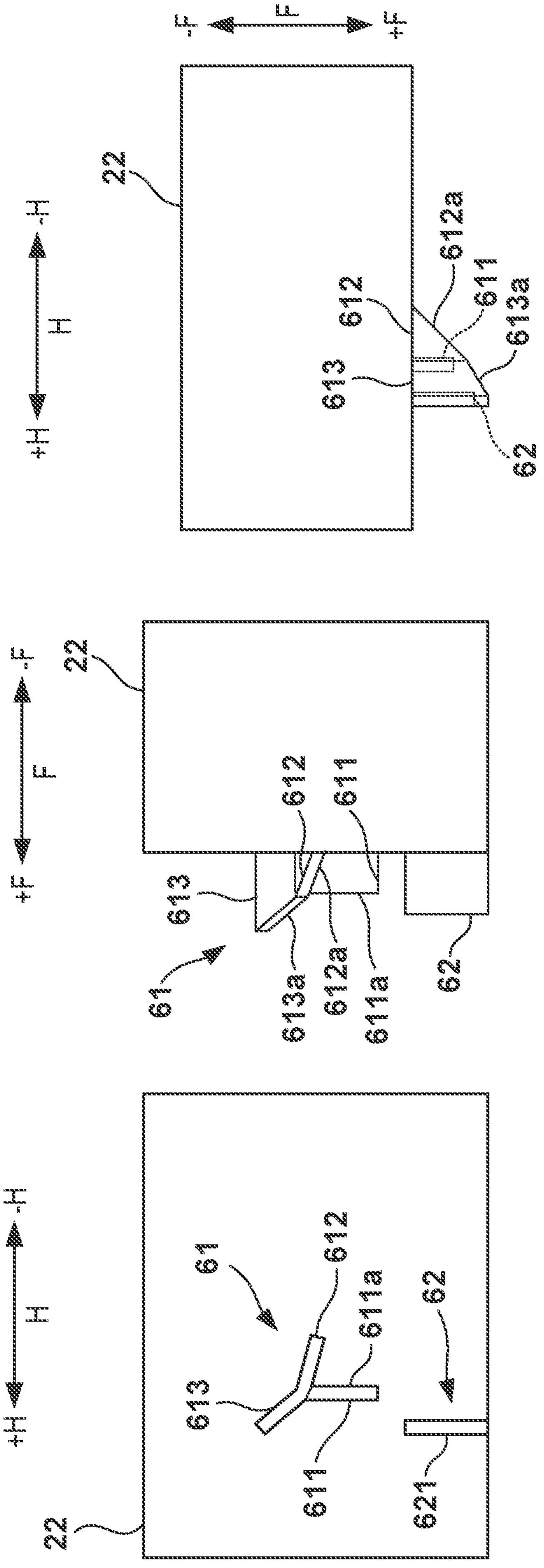
FIG. 5A is a view that illustrates a configuration of a carriage side of the connecting part.
FIG. 5B is a view that illustrates a configuration of a carriage side of the connecting part.
FIG. 5C is a view that illustrates a configuration of a carriage side of the connecting part.

FIG. 4A to FIG. 4C are views that illustrate the configurations of the cutter unit 3 and the cutter unit 3 side of the connecting part 6, FIG. 4A is a front surface view, FIG. 4B is a left side surface view, and FIG. 4C is a plan view. FIG. 5A to FIG. 5C are views that illustrate the configurations of the carriage 22 side of the connecting part 6; FIG. 5A is a front surface view, FIG. 5B is a right side surface view, and FIG. 5C is a plan view. Note that the front surface view of FIG. 4A and FIG. 5A are views of when the housing 12 is looked into from the discharge port 18 side.

The cutter unit 3 includes a first cutter blade 31, an upper holding member 33 that holds the first cutter blade 31 so it can rotate, a second cutter blade 32, and a lower holding member 34 that holds the second cutter blade 32 so it can rotate. The upper holding member 33 and the lower holding member 34 are arranged so as to be apart in an up/down direction sandwiching a region through which the printing medium S passes and are connected by a connecting member 35. Also, the lower holding member 34 is supported by the supporting member 5 so as to be able to move in the main scanning direction H. For example, the first cutter blade 31 and the second cutter blade 32 rotate in accordance with the movement of the cutter unit 3 in the main scanning direction H and then cuts the printing medium S by contacting, in a rotating state, the printing medium S.

The connecting part 6 is something for connecting/separating the carriage 22 and the cutter unit 3. In the present embodiment, a driving source that drives (scans) the cutter unit 3 is not arranged. Therefore, by the connecting part 6 connecting the cutter unit 3 and the carriage 22, the cutter unit 3 follows the movement of the carriage 22. The connecting part 6 includes a first coupling member 61 and a second coupling member 62 as a configuration of the carriage 22 side and includes a first engagement member 63 that engages with the first coupling member 61 and a second engagement member 64 that engages with the second coupling member 62 as a configuration of the cutter unit 3 side.

The first engagement member 63 engages with the first coupling member 61 when the cutter unit 3 moves to the main scanning direction −H side. The first engagement member 63 is positioned further in an upwards direction than the second engagement member 64 in the up/down direction. The second engagement member 64 has a lever 631 that extends from the upper holding member 33. The lever 631 is attached to the upper holding member 33 via a joint 632. The lever 631 is able to pivot in the up/down direction and the auxiliary scanning direction F with the joint 632 as the supporting point. The lever 631, in a state in which it is not connected with the carriage 22, is biased in the upwards direction and in the auxiliary scanning −F direction by a biasing member 635. The biasing member 635 is an elastic member such as a spring, for example.

On the distal end of the lever 631, an engagement claw 633 that extends towards the carriage 22 side (auxiliary scanning −F direction) is arranged. The engagement claw 633 has an engagement surface 634 on the distal end side of the lever 631 that spreads in a direction that intersects the main scanning direction H. In the present embodiment, the engagement surface 634 is a surface that intersects the main scanning direction H. Also, an inclination portion 636 that extends towards the auxiliary scanning direction +F side and the main scanning direction −H side from the end on the conveyance direction upstream side of the engagement claw 633 to the lever 631 is arranged.

The second engagement member 64 engages with the second coupling member 62 when the cutter unit 3 moves to the main scanning direction +H side. The first engagement member 63 is positioned further in a downwards direction than the second engagement member 64 in the up/down direction. The second engagement member 64 is a plate member that extends in the auxiliary scanning −F direction from the upper holding member 33.

The first coupling member 61 engages with the first engagement member 631 when the carriage 22 moves to the main scanning direction −H side. The first coupling member 61 is arranged so as to protrude from the side surface on the auxiliary scanning direction +F side of the carriage 22 in the auxiliary scanning +F direction. The first coupling member 61 includes a part 611 that extends in the up/down direction, a part 612 that extends in the main scanning −H direction and in the downward direction from the end in the upper side of the part 611, and a part 613 that extends in the main scanning +H direction and in an upwards direction from the end on the upper side of the part 611. The part 611 has a connecting surface 611*a* that spreads in a direction that intersects the main scanning direction H. In the present embodiment, the connecting surface 611*a* is a surface that spreads in a direction orthogonal to the main scanning direction H. Also, the part 612 includes an inclination portion 612*a* that is inclined in the main scanning +H direction and the auxiliary scanning +F direction from the end in the main scanning −H direction. Also, the part 613 includes an inclination portion 613*a* that is inclined in the main scanning +H direction and the auxiliary scanning +F direction from the end on the main scanning direction −H side.

The second coupling member 62 connects with the second engagement member 64 when the carriage 22 moves to the main scanning direction +H side. The second coupling member 62 is arranged further in a downward direction than the first coupling member 61 in the up/down direction. The second coupling member 62 is a plate-shaped member that that is long in the up/down direction and extends in the +F direction from the side surface on the auxiliary scanning direction +F side of the carriage 22. The second coupling member 62 has a connecting surface 621 that extends in a direction that intersects the main scanning direction H. In the present embodiment, the connecting surface 621 is a surface that is orthogonal to the main scanning direction H.

Figure 6A:
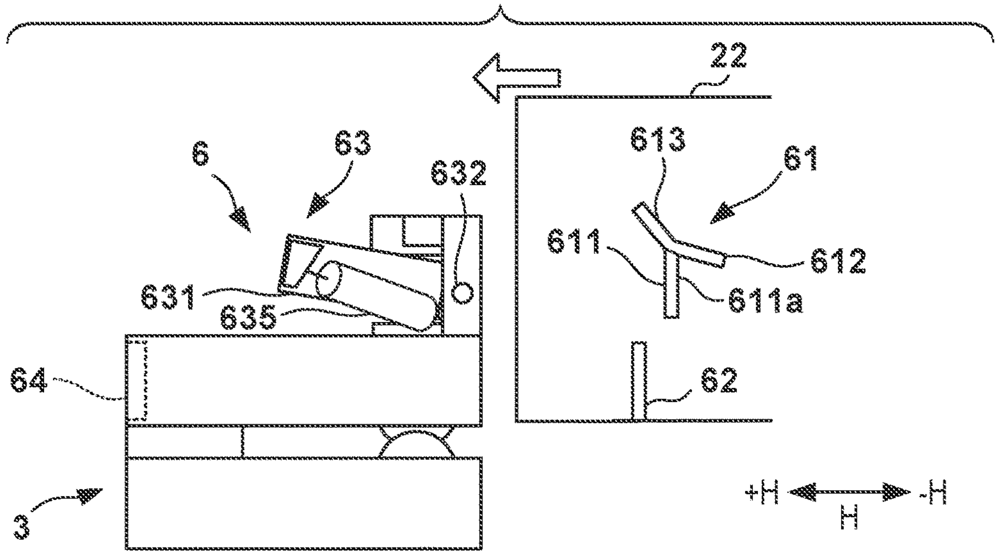
FIG. 6A is a view that schematically illustrates a connection operation of a connecting member.
Figure 6B:
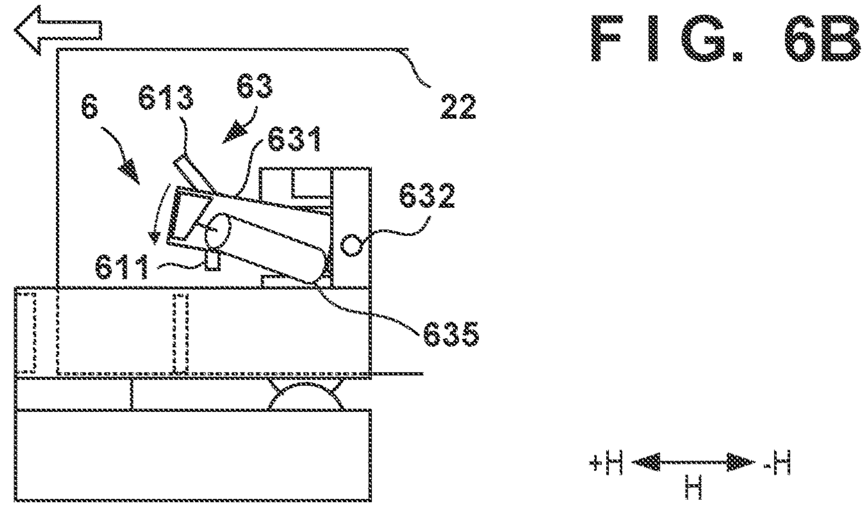
FIG. 6B is a view that schematically illustrates a connection operation of a connecting member.
Figure 6C:
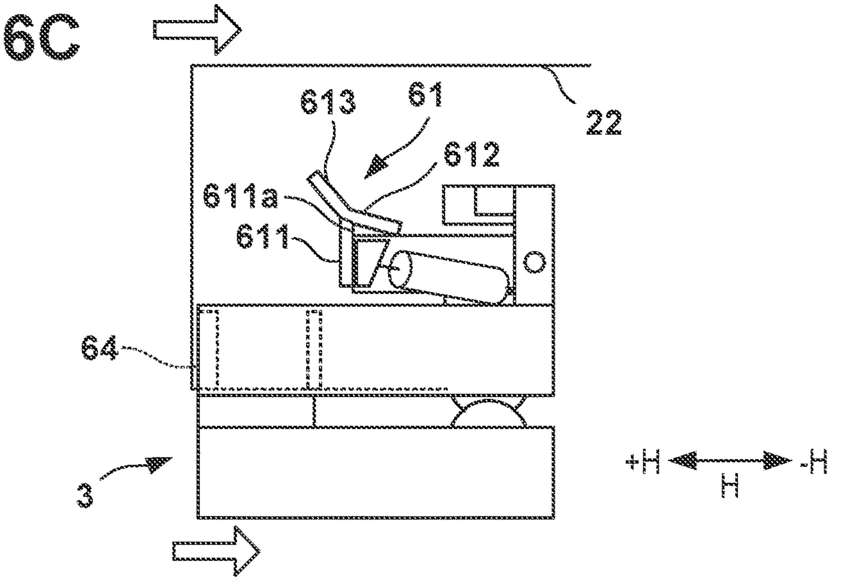
FIG. 6C is a view that schematically illustrates a connection operation of a connecting member.
Figure 7A:
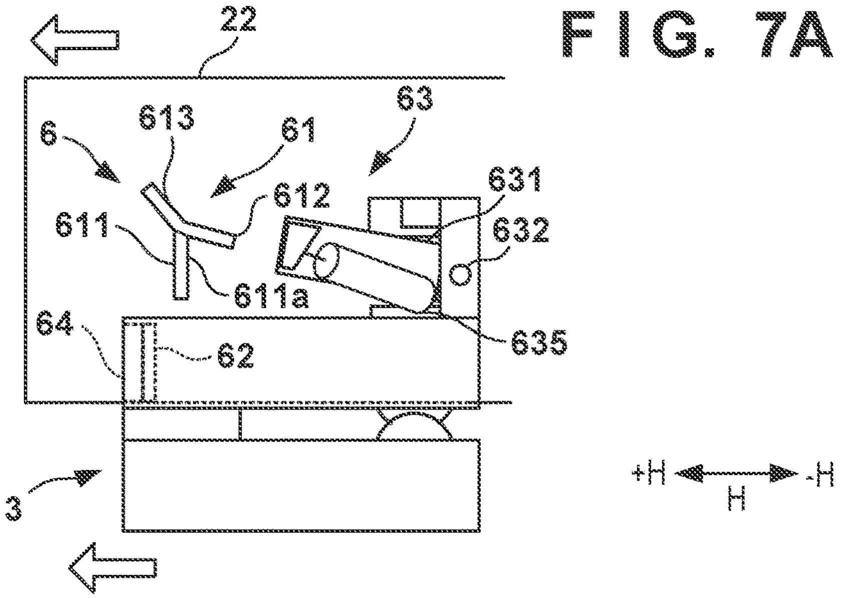
FIG. 7A is a view that schematically illustrates a disconnection operation of a connecting member.
Figure 7B:
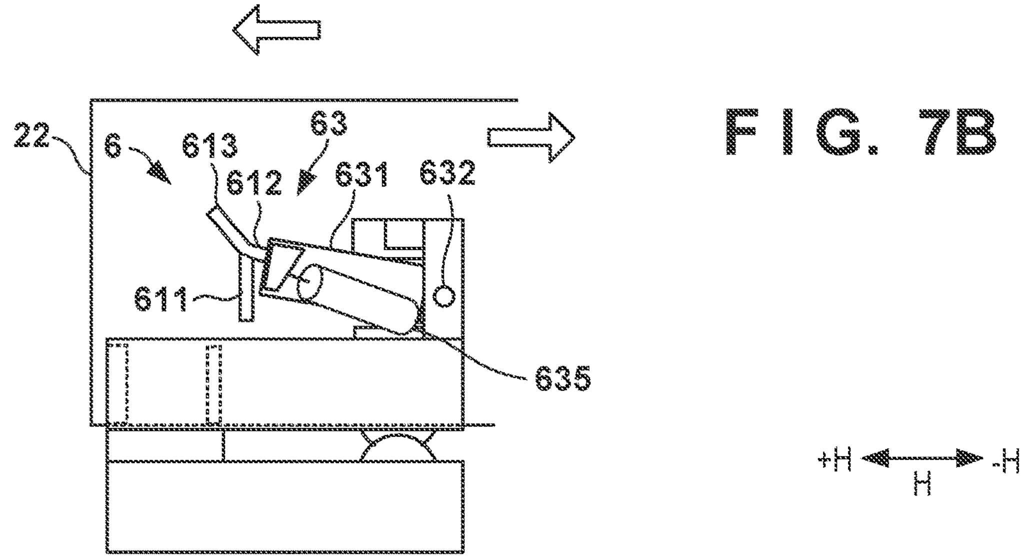
FIG. 7B is a view that schematically illustrates a disconnection operation of a connecting member.
Figure 7C:
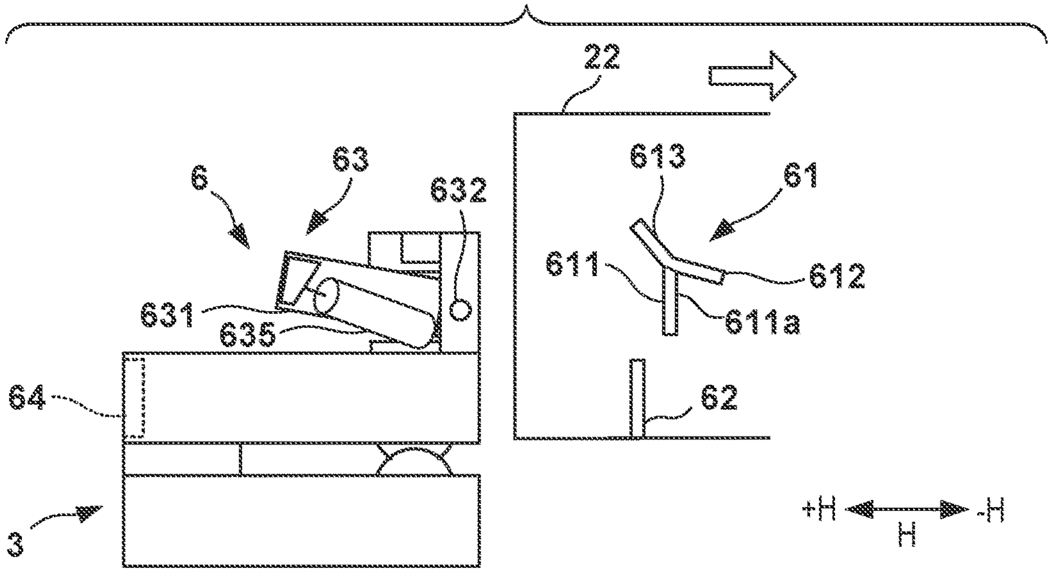
FIG. 7C is a view that schematically illustrates a disconnection operation of a connecting member.
Figure 8A:
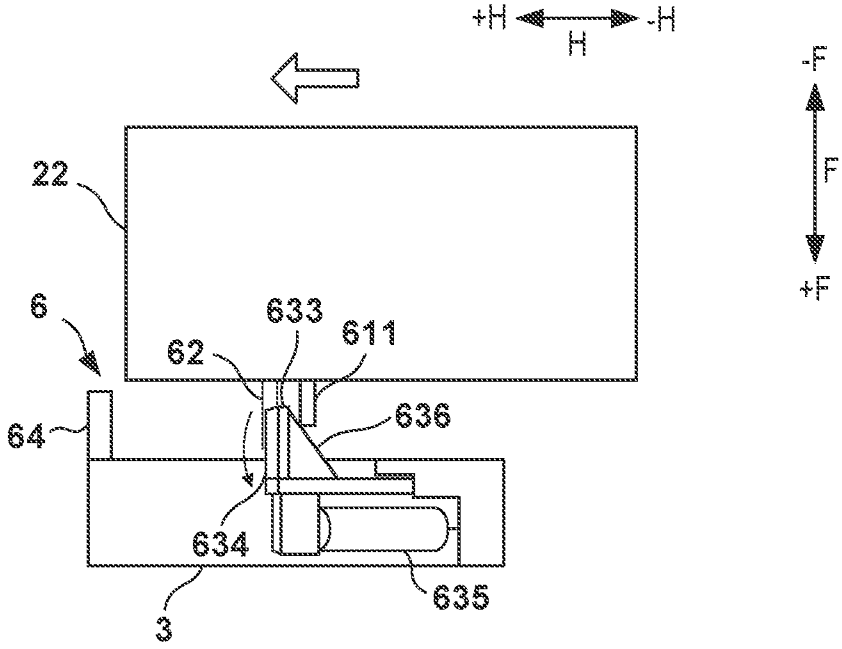
FIG. 8A is a plan view of a state in FIG. 6B.
Figure 8B:
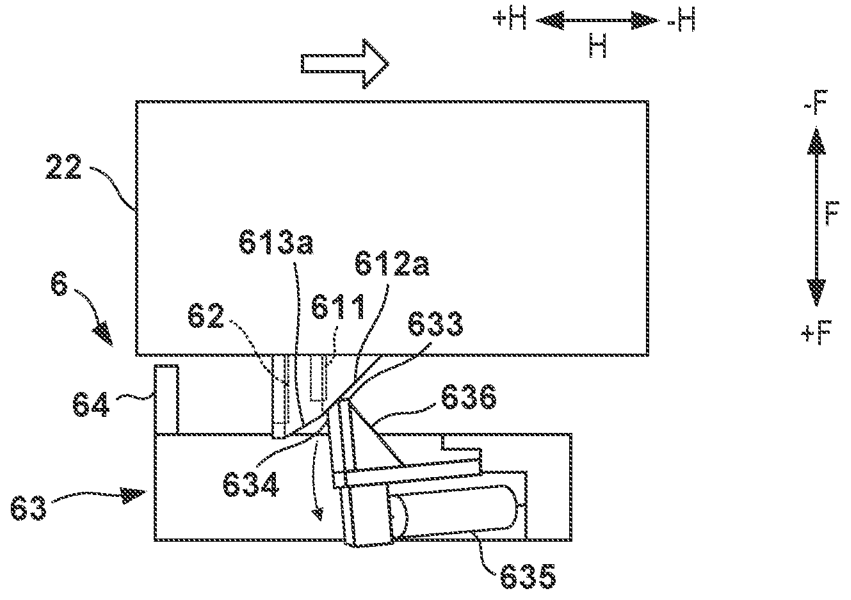
FIG. 8B is a plan view of a state in FIG. 7B.

Below, connection of the carriage 22 and the cutter unit 3 by the connecting part 6 and an operation for disengaging that connection will be described. FIG. 6A to FIG. 6C are views that schematically illustrate a connection operation of the connecting part 6. Also, FIG. 7A to FIG. 7C are views that schematically illustrate the disconnection operation of the connecting part 6. Also, FIG. 8A is a plan view of the state in FIG. 6B and a view in which the part 612 and the part 613 were omitted, and FIG. 8B is a plan view of the state in FIG. 7B.

While printing is being performed on the printing medium S by the printing unit 2, the cutter unit 3 is positioned further in the main scanning +H direction than a range in which printing is performed by the printing unit 2. The cutter unit 3 is positioned, for example, at the home position HP3 of the cutter unit 3 on the end in the main scanning +H direction or at a standby position WP (refer to FIG. 11) on a supporting member (supporting member 5) that was set by processing that will be described later. Then, when printing of an image to the printing medium S by the printing unit 2 is ended, the carriage 22 moves to the main scanning direction +H side to a position where the cutter unit 3 is in order to connect with the cutter unit 3 (FIG. 6A).

As the carriage 22 moves to the main scanning direction +H side, the part 613 on the carriage 22 side and the engagement claw 633 of the first engagement member 63 on the cutter unit 3 side contact, and the lever 631 is caused to pivot in the downward direction by the bottom surface of the part 613 (FIG. 6B). Also, the inclination portion 636 of the first engagement member 63 contacts the part 611 (FIG. 8A), and the lever 631 also pivots to the auxiliary scanning direction +F side. By this, the engagement claw 633 will pass over the part 611 and be positioned on the main scanning direction −H side of the part 611.

After the engagement claw 633 passes over the part 611, when the carriage 22 switches the movement direction to be in the main scanning −H direction, the connecting surface 611*a* contacts with the engagement surface 634. By this, when the carriage 22 moves to the main scanning direction −H side, the engagement surface 634 is pressed by the connecting surface 611*a*, and so the cutter unit 3 is able to follow the movement of the carriage 22 (FIG. 6C).

In the present embodiment, the processing unit 71, having confirmed based on the detection result of the sensor 24 that the carriage 22 and the cutter unit 3 are in a positional relationship in which they are able to connect, connects the carriage 22 and the cutter unit 3 by reversing the movement direction of the carriage 22. In other words, the processing unit 71 performs control for connecting the carriage 22 and the cutter unit 3 by controlling the rotation of the carriage motor 221 based on the detection result of the sensor 24.

Next, disconnection of the carriage 22 and the cutter unit 3 will be described. After the cutter unit 3 cuts the printing medium S, it is necessary to disengage the connection of the carriage 22 and the cutter unit 3 in order for the printing unit 2 to print an image on the succeeding printing medium S. For this, when the carriage 22 switches the movement direction from the main scanning −H direction to the main scanning +H direction, the part 611 and the engagement claw 633 will no longer be in contact, and the second coupling member 62 will be pushing the second engagement member 64. By this, the cutter unit 3 follows the movement of the carriage 22 and moves to the main scanning +H side (FIG. 7A). Note that at this time, the lever 631 is pivoted in the upward direction by the biasing member 635.

When the cutter unit 3 reaches a predetermined position, the carriage 22 reverses the movement direction to the main scanning −H direction (FIG. 7B). Then, with the lever 631 in a state in which it is biased in the upwards direction and to the carriage 22 side by the biasing member 635, the engagement claw 633 pivots to the auxiliary scanning direction +F side following the inclination portion 612*a* of the part 612. As illustrated in FIG. 8B, in the position at which the part 611 and the part 612 connect, the protrusion amount, from the carriage 22, of the part 612 is greater than that of the part 611. By this, the engagement claw 633 will pass over the part 611 and be positioned on the main scanning direction +H side of the part 611. By this, the connection of the carriage 22 and the cutter unit 3 is disengaged, and so even if the carriage 22 further moves in the −H direction, contacting of the engagement claw 633 and the part 611 is avoided, and the cutter unit 3 will stop at a predetermined position (FIG. 7C).

In the present embodiment, the processing unit 71, having confirmed based on the detection result of the sensor 25 that the carriage 22 and the cutter unit 3 are in a predetermined position, disengages the connection between the carriage 22 and the cutter unit 3 by reversing the movement direction of the carriage 22. In other words, the processing unit 71 performs control for disconnection of the carriage 22 and the cutter unit 3 by controlling the rotation of the carriage motor 221 based on the detection result of the sensor 25. Note that the predetermined position where the connection between the cutter unit 3 and the carriage 22 is disengaged may be the standby position WP that is set by processing that is described later or the home position HP3 of the cutter unit 3, which is at the end on the main scanning direction +H side on the supporting member 5.

<Processing Example>

Figure 9:
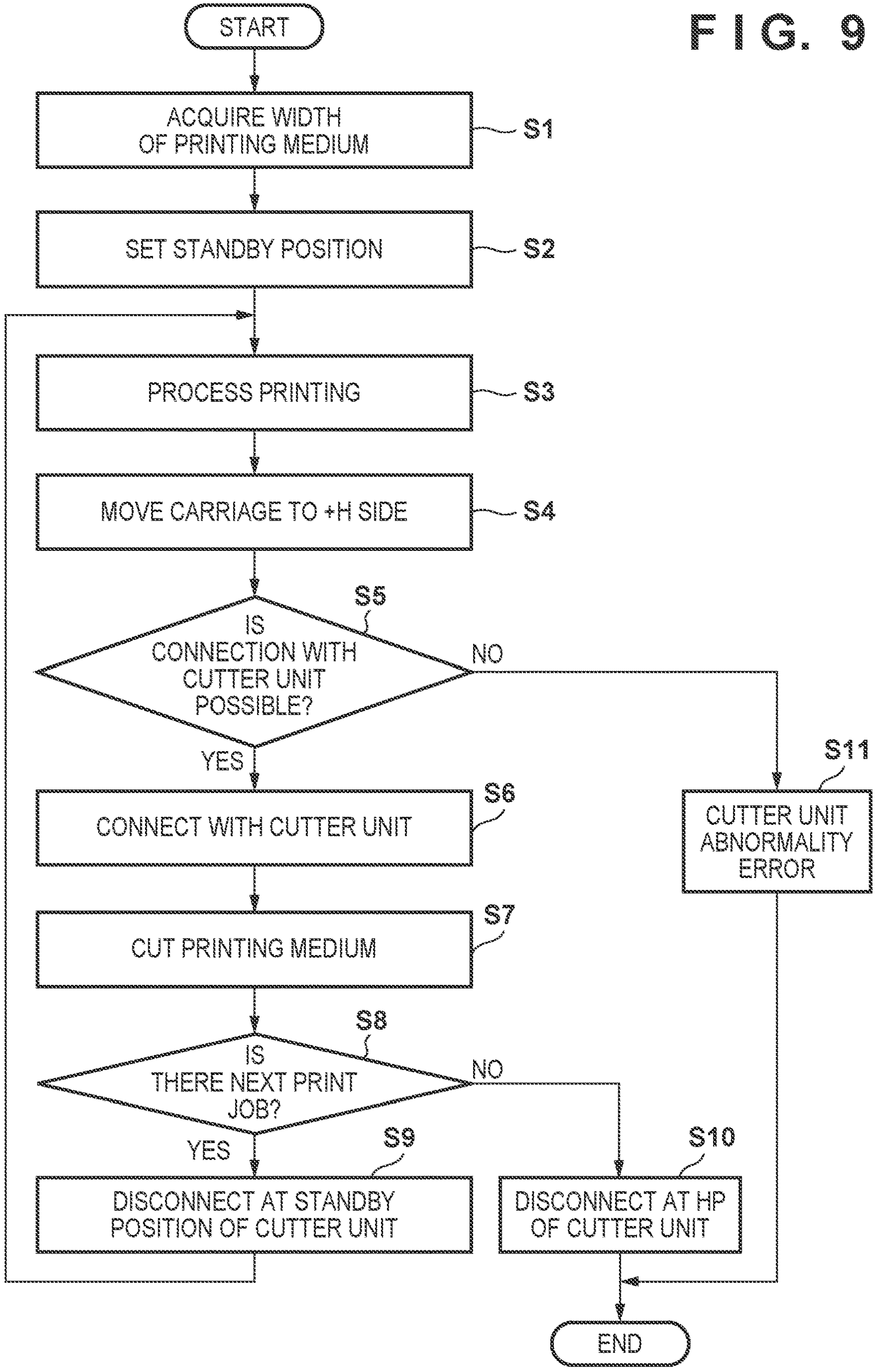
FIG. 9 is a flowchart that illustrates a processing example of a control unit.

FIG. 9 is a flowchart that illustrates an example of processing by the control unit 7. The present flowchart is started in a case where a print job is executed by an instruction from the host computer 100, for example.

In step S1, the processing unit 71 acquires the size in the widthwise direction, in other words, the main scanning direction H, of the printing medium S. In the present embodiment, the processing unit 71 acquires the width of the printing medium S based on the detection result of the sensor 25 that is able to detect the edge of the printing medium S. However, the processing unit 71 may acquire the width of the printing medium S based on setting information of a sheet size that is inputted by a user.

In step S2, the processing unit 71 sets, in accordance with the size of the printing medium S, the standby position WP on the supporting member 5 of the cutter unit 3. For example, the processing unit 71 sets the standby position WP of the cutter unit 3 at a position that is apart by a predetermined distance from the edge on the main scanning direction +H side of the printing medium S based on the size of the printing medium S acquired in step S1. For example, the standby position WP is a position that is separated by 0 to 50 mm in the main scanning +H direction from the edge on the main scanning direction +H side of the printing medium S. For example, the standby position WP is a position that is separated by 10 to 30 mm in the main scanning +H direction from the edge on the main scanning direction +H side of the printing medium S.

Note that the processing unit 71 may store in the storage unit 73 in association with the size of the printing medium S information regarding the set standby position WP. Also, the processing unit 71, in executing the next and subsequent jobs, in a case where the size of the printing medium S acquired in step S1 is the same as the size that is stored in the storage unit 73, may use the stored standby position WP and in a case where the size is changed, may change the setting of the standby position WP.

In step S3, the processing unit 71 performs processing for printing an image on the printing medium S by the printing unit 2. In step S4, the processing unit 71 causes the carriage 22 to move to a back position side, in other words, to the main scanning direction +H side.

In step S5, the processing unit 71 confirms whether or not the carriage 22 can connect with the cutter unit 3. The processing unit 71, in a case where connection is possible, proceeds to the processing in step S6 and in a case where connection is not possible, proceeds to the processing in step S11.

Figure 10:
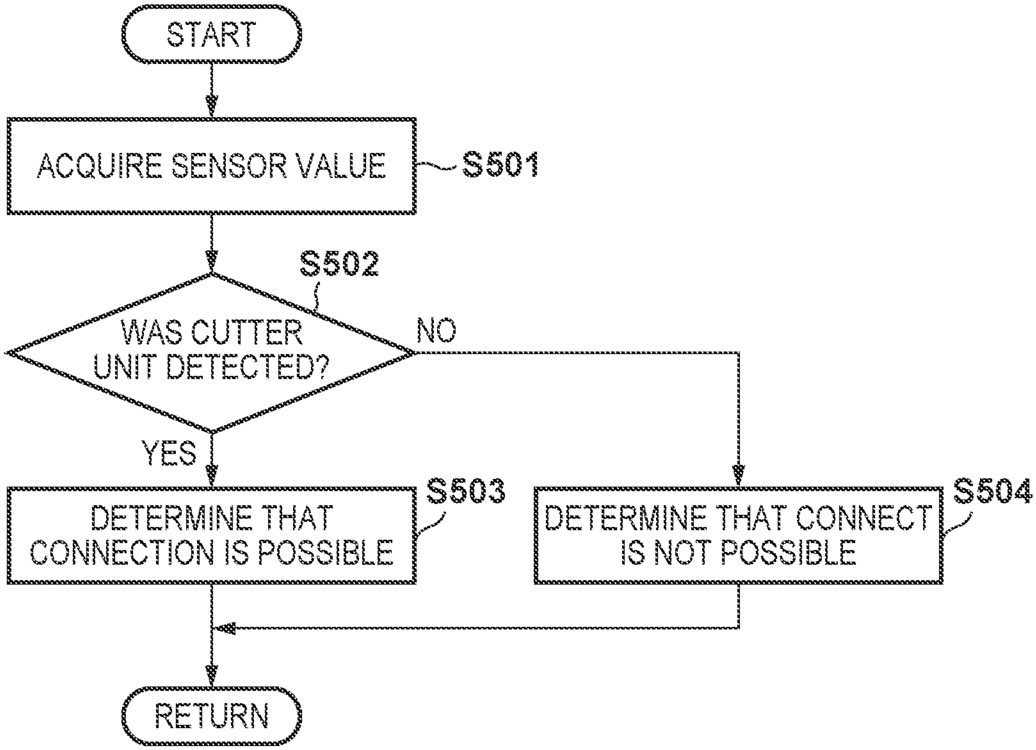
FIG. 10 is a flowchart that illustrates a processing example of a control unit.

FIG. 10 is a flowchart that illustrates the processing details of step S5 in FIG. 9. In step S501, the processing unit 71 confirms whether or not the sensor 24 has detected the cutter unit 3. The processing unit 71, in a case where the sensor 24 has detected the cutter unit 3, proceeds to step 502 and in a case where the sensor 24 has not detected the cutter unit 3, proceeds to step S503. In step S502, the processing unit 71 determines that the carriage 22 and the cutter unit 3 are able to connect. Meanwhile, in step S503, the processing unit 71 determines that the carriage 22 and the cutter unit 3 cannot be connected.

In step S6, the processing unit 71 connects the carriage 22 and the cutter unit 3. For example, the processing unit 71, by reversing the movement direction of the carriage 22 that is moving to the back position side, engages the first coupling member 61 and the first engagement member 63, thereby connecting the carriage 22 and the cutter unit 3.

In step S7, the processing unit 71 cuts the printing medium S by the cutter unit 3. Specifically, the processing unit 71, by causing the carriage 22 to move to the main scanning direction −H side, causes the cutter unit 3 to follow, thereby cutting the printing medium S.

In step S8, the processing unit 71 confirms whether or not there is a next print job. The processing unit 71, in a case where there is a next print job, proceeds to the processing in step S9 and in a case where there is no next print job, proceeds to the processing in step S10.

In step S9, the processing unit 71 disengages the connection of the carriage 22 and the cutter unit 3 at the standby position WP of the cutter unit 3 and then returns to the processing in step S3. Specifically, the processing unit 71, by reversing the movement direction of the carriage 22 at the standby position WP set in step S2, disengages the connection of the carriage 22 and the cutter unit 3. At this time, the processing unit 71 confirms whether or not the standby position WP of the cutter unit 3 was reached based on the detection result of the sensor 25 and an encoder sensor and the like for detecting the position of the carriage 22, for example. For example, the processing unit 71, after detecting the edge of the printing medium S by the sensor 25, confirms by the encoder sensor that movement from the edge by a predetermined amount in the +H direction was performed. By this, because the movement distance of the carriage 22 during disconnection becomes shorter when compared to a case where the connection is disengaged at the home position HP3 of the cutter unit 3, time that is required for disconnection can be shortened. Also, during a printing operation that is related to the succeeding printing medium S, the cutter unit 3 will be waiting at the standby position WP. Accordingly, when the carriage 22 and the cutter unit 3 connect after the last printing operation that is related to a succeeding printing medium SH2, the carriage 22 can connect with the cutter unit 3 at the standby position WP, which is at a position that is closer than the home position HP3. Therefore, the time that is required for connection for cutting the succeeding printing medium S can also be shortened.

In a case where the processing is proceeded from step S8 to S10, in step S10, the processing unit 71 disengages the connection of the carriage 22 and the cutter unit 3 at the home position HP3 of the cutter unit 3 and then ends the flowchart. By this, in a case where all print jobs are completed, the cutter unit 3 will be placed at the home position HP3. Accordingly, it is possible to prevent the cutter unit 3 from impeding the replacement in a case where after the print jobs are completed the user replaces the printing medium S with a printing medium whose width of a sheet is different.

In a case of proceeding from step S5 to S11, in step S11, the processing unit 71 notifies an abnormality error of the cutter unit 3 and then ends the flowchart. For example, in a case where the printing apparatus 1 comprises a display screen that is able to display various information, the processing unit 71 displays on the display screen information that is related to an error of the cutter unit 3. Alternatively, the processing unit 71 may display on the display screen of the host computer 100 via a driver.

As described above, in the present embodiment, the standby position of the cutter unit 3 is set in accordance with the size of the printing medium S. Accordingly, when compared to a case where the cutter unit 3 waits at HP3, the movement distance of the carriage 22 will be shorter when the carriage 22 connects with the cutter unit 3 or disengages that connection. Therefore, the time that is required for cutting the printing medium S is shortened, and it becomes possible to improve the throughput of the printing apparatus 1.

Note that, although in the present embodiment, a configuration was taken so as to arrange the sensor 24 that detects the presence/absence of the cutter unit 3, a configuration may be taken so as to detect by an encoder sensor of the carriage 22 the position of the cutter unit 3. In other words, it is possible to adopt a configuration that manages by calculating by the encoder sensor the position in the main scanning direction H where a connection/disengagement operation of the cutter unit 3 and the carriage 22 was performed and then storing that position.

Second Embodiment

In the first embodiment, the processing unit 71 confirmed by the sensor 24 that the carriage 22 and the cutter unit 3 can connect. The second embodiment differs from the first embodiment in that the processing unit 71, based on a load on a carriage 1122, confirms that the carriage 1122 and a cutter unit 113 can connect. Also, although, in the first embodiment, the carriage 22 and the cutter unit 3 were connected by a mechanical configuration, the second embodiment differs from the first embodiment in that the carriage 1122 and the cutter unit 3 are connected by a translatable actuator. Note that the points of difference from the first embodiment will be described primarily in the description below, and regarding configurations that are the same as the first embodiment, the same reference numerals will be assigned and description thereof will be omitted.

Figure 11A:
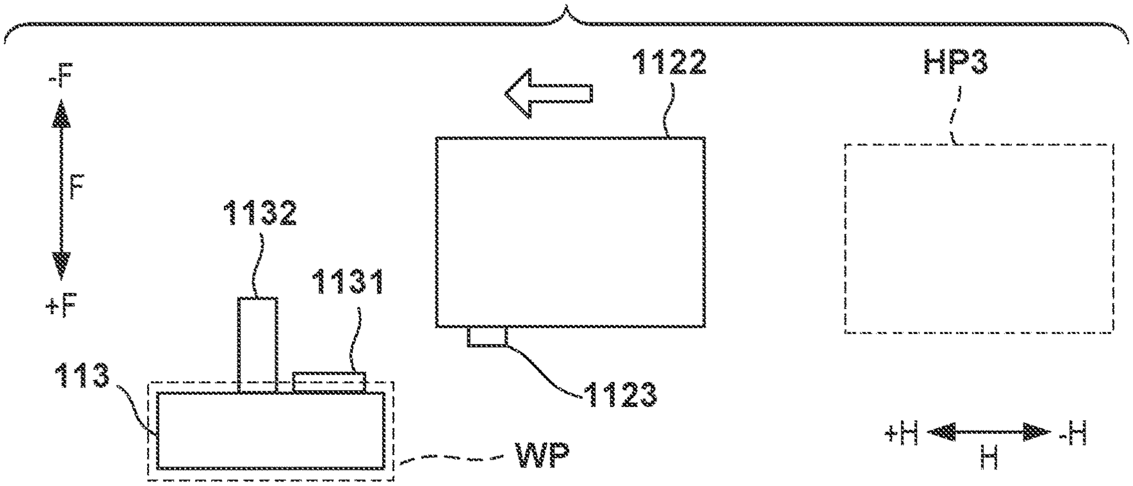
FIG. 11A is a view that illustrates a configuration of connection of the carriage and the cutter unit according to an embodiment.
Figure 11B:
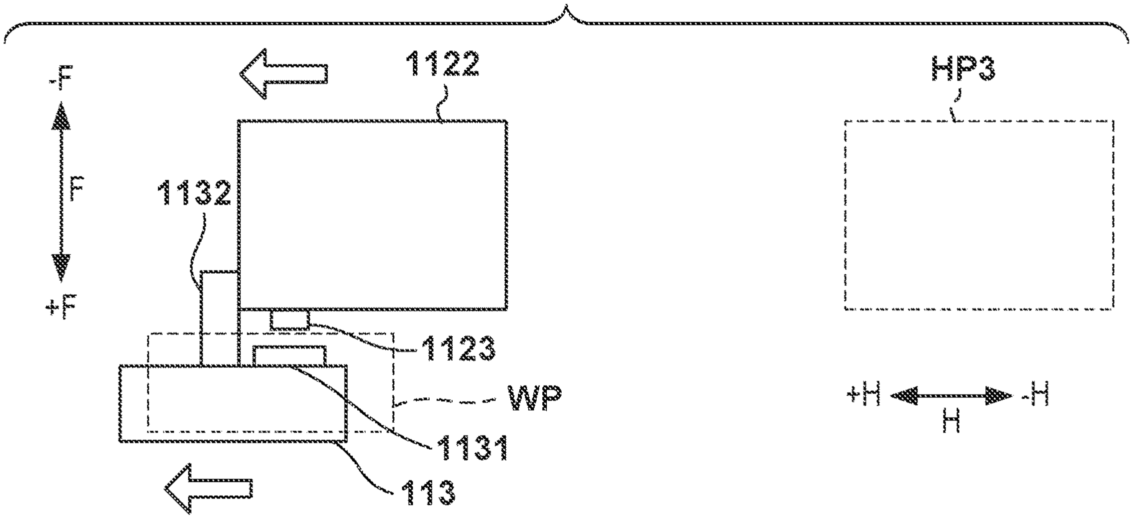
FIG. 11B is a view that illustrates a configuration of connection of the carriage and the cutter unit according to an embodiment.
Figure 11C:
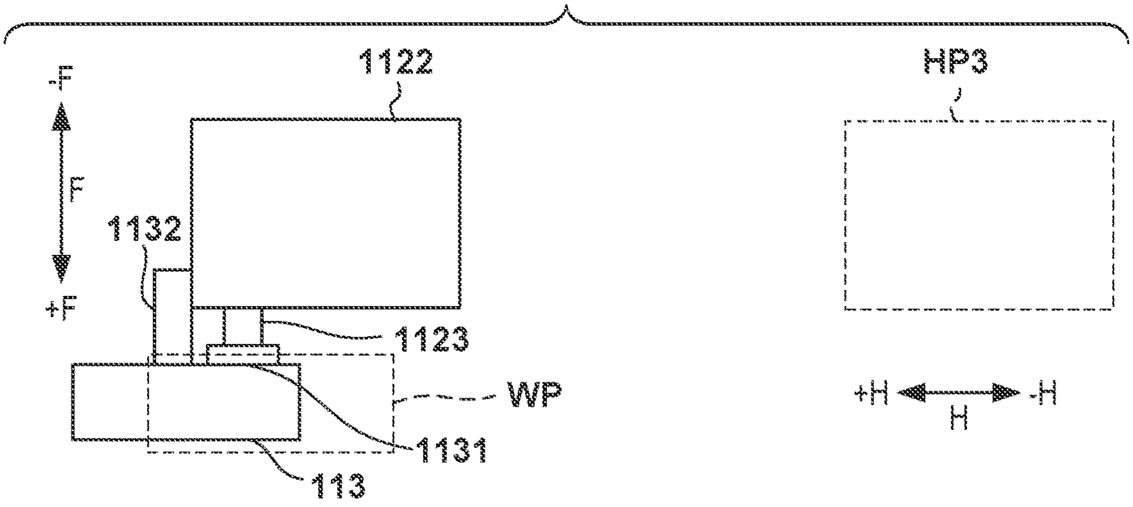
FIG. 11C is a view that illustrates a configuration of connection of the carriage and the cutter unit according to an embodiment.

FIG. 11A to FIG. 11C are views that illustrate a configuration of connection of the carriage 1122 and the cutter unit 113 according to an embodiment. In the present embodiment, the carriage 1122 includes an actuator 1123 that is translatable in the auxiliary scanning direction F. The actuator 1123, although it may adopt a conventional configuration, may have a mechanism such as a motor and a rack and pinion which convert into a linear motion the rotation of the motor, for example. The cutter unit 113 has an engagement portion 1131 that engages with the actuator 1123 and a protruding portion 1132 which is arranged so as to overlap with a portion of the carriage 1122 when viewed in the main scanning direction H. In the present embodiment, the actuator 1123 and the engagement portion 1131 are arranged in a positional relationship in which they engage with each other when the protruding portion 1132 contacts a side surface 1122*a* of the carriage 22.

When the carriage 1122 moves to the main scanning direction +H side, the protruding portion 1132 contacts the side surface 1122*a* on the main scanning direction +H side of the carriage 1122 and then the cutter unit 113 moves in accordance with the movement of the carriage 1122 (FIG. 11B). At this time, the carriage 1122 and the cutter unit 113 move in a positional relationship in which the actuator 1123 and the engagement portion 1131 are able to engage. In such a state, by the actuator 1123 operating and then stretching to the cutter unit 113 side (auxiliary scanning direction +F side), the carriage 1122 and the cutter unit 113 connect (FIG. 11C).

Figure 12:
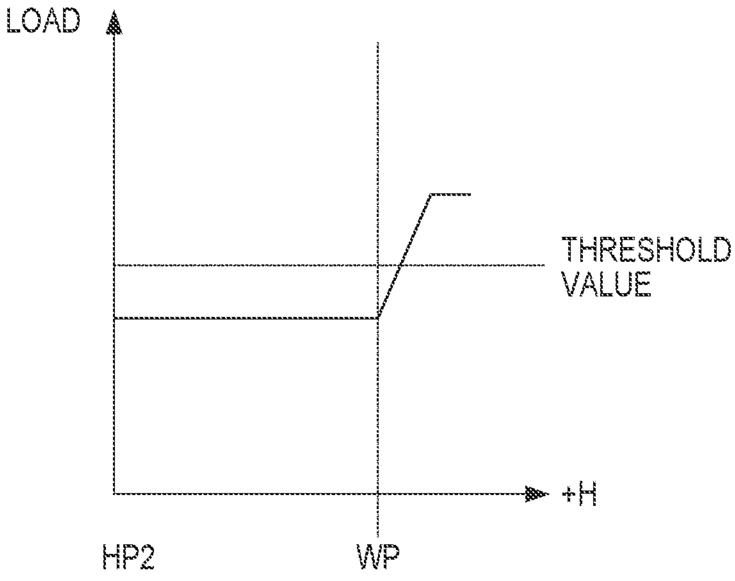
FIG. 12 is a view that illustrates a load that occurs on a carriage motor.

FIG. 12 is a view that illustrates a load that occurs on the carriage motor 221. In a case where the cutter unit 113 moves in accordance with the movement of the carriage 1122, the load on the carriage motor 221 becomes higher than the load on the carriage motor 221 in a case where the carriage 1122 moves independently. Accordingly, as the carriage 1122 moves to the main scanning direction +H side from its home position HP2, the load on the carriage motor 221 increases when the carriage 22 and the protruding portion 1132 contacts. In other words, it can be said that the protruding portion 1132 serves the role of load generation during the movement of the carriage 22.

Therefore, the processing unit 71, based on the load on the carriage motor 221, can confirm that the cutter unit 113 is moving in accordance with the carriage 1122. Also, the carriage 1122 and the cutter unit 113 move in a positional relationship in which the actuator 1123 and the engagement portion 1131 are able to engage. Accordingly, the processing unit 71 is able to engage the actuator 1123 and the engagement portion 1131 by driving the actuator 1123.

The processing unit 71 may acquire the driving current value of the carriage motor 221 as information that is related to the load on the carriage motor 221. Then, in a case where the driving current value is at a predetermined value or greater, the processing unit 71 may determine that the load on the carriage motor 221 is at a threshold value or greater. Also, the acceleration sensor (not illustrated) may be arranged in the carriage 1122, and the processing unit 71 may acquire the detection result of the acceleration sensor as information that is related to the load on the carriage motor 221. Then, the processing unit 71 may determine whether or not the load on the carriage motor 221 is at a threshold value or greater based on variance of the acceleration when the carriage 1122 and the protruding portion 1132 contact.

Figure 13:
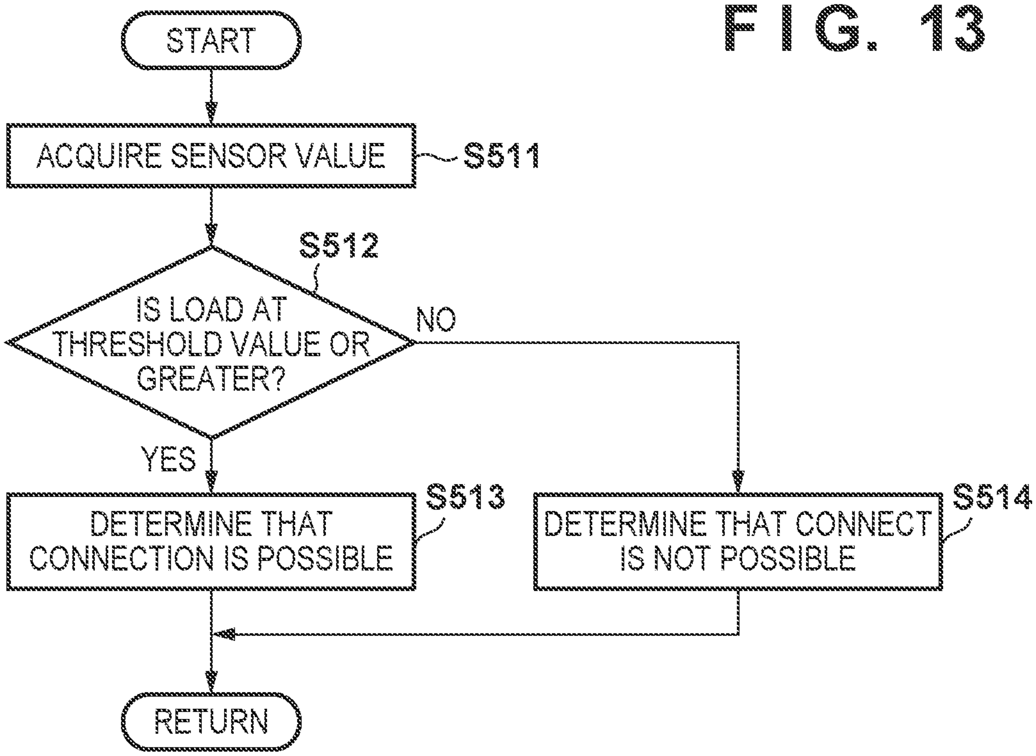
FIG. 13 is a flowchart that illustrates a processing example of a control unit.

FIG. 13 is a flowchart that illustrates a processing example of the control unit 7 according to an embodiment and is a flowchart that illustrates a detailed example of the processing in step S5 in FIG. 9. Note that the processing unit 71 may perform the same processing as the first embodiment regarding processing besides that in step S5 in FIG. 9.

In step S511, the processing unit 71 acquires a sensor value as information that is related to the load on the carriage motor 221. As described above, the processing unit 71 acquires the driving current value of the carriage motor 221, the acceleration of the carriage 1122, and the like as a sensor value.

In step S512, the processing unit 71 confirms whether or not the load on the carriage motor 221 is at the threshold value or greater. The processing unit 71, in a case where the load is at the threshold value or greater, proceeds to step S513 and then determines that the carriage 1122 and the cutter unit 113 can connect, and in a case where the load is less than the threshold value, proceeds to step S514 and then determines that the carriage 1122 and the cutter unit 113 cannot connect.

As described above, by virtue of the present embodiment, the processing unit 71 is able to execute control of the connection between the carriage 1122 and the cutter unit 113 based on the load on the carriage motor 221. Furthermore, in a case where the driving current value of the carriage motor 221 is acquired as information that is related to the load, the sensor 24 that detects the presence/absence of the cutter unit is unnecessary. Therefore, control of the connection between the carriage 1122 and the cutter unit 113 can be executed by a simpler configuration.

Note that the configuration according to the first embodiment and the configuration according to the second embodiment can be combined as appropriate. For example, a mechanical connection structure according to the first embodiment may be adopted as a structure of the connecting part, and the processing in FIG. 13 according to the second embodiment may be adopted as processing of determination of whether or not the carriage and the cutter unit can connect. Also, a connection structure by the actuator 1123 according to the second embodiment may be adopted as a structure of the connecting part, and the processing in FIG. 10 according to the first embodiment may be adopted as processing for determining whether or not the carriage and the cutter unit can connect.

Third Embodiment

The third embodiment differs from the first and second embodiments in the timing at which the connection of the carriage and the cutter unit after cutting the printing medium S is disengaged. In the following, a configuration that is different from the first embodiment and the second embodiment will be described primarily, and regarding the configuration that is the same, the same reference numerals will be assigned and description thereof will be omitted FIG. 14 is a plan view of the printing apparatus 1 according to the embodiment and is a view that illustrates a state in which cutting of a preceding printing medium SH1 and cuing of a succeeding printing medium SH2 are performed. In the first embodiment and the second embodiment, after cutting the preceding printing medium SH1, the carriage was made to move in order to make the cutter unit 3 wait at the standby position WP before printing on the succeeding printing medium SH2. However, in such a case, it is necessary to cause the carriage 22 to move back and forth in spite of the fact that printing by the printing unit 2 is not performed.

Meanwhile, in a case a distance L1 between a cutting position C of the cutter unit 3 and a printing area A2 by the printhead 21 is greater than a distance L2 which is from the leading edge of the succeeding printing medium SH2 to a print intended area A1, the leading edge of the printing medium SH2 does not reach the cutting position C during printing of the first scan. Accordingly, even if printing of the first scan is performed while the cutter unit 3 is still connected, the printing medium SH2 will not be cut by the cutter unit 3. Thus, in the third embodiment, in a case where a predetermined condition is satisfied, by performing some of the printing by the printing unit 2 while the cutter unit 3 is still connected, the throughput is improved.

Figure 15:
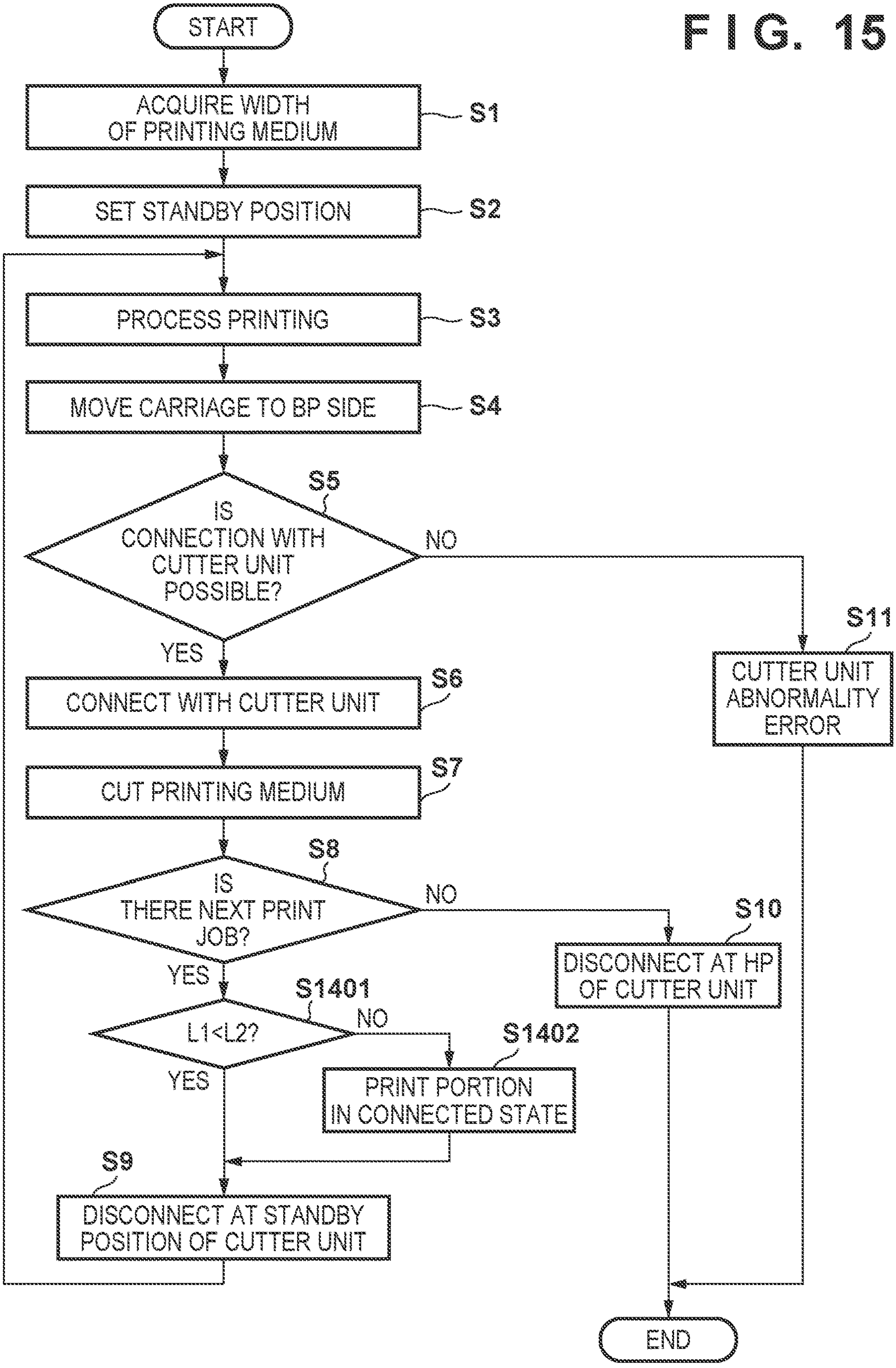
FIG. 15 is a flowchart that illustrates a processing example of the control unit.

FIG. 15 is a flowchart that illustrates an example of control of the processing unit 71. Note that description is omitted regarding processing that is the same as the processing in FIG. 9 of the first embodiment.

The processing unit 71, in a case where it determines that there is a next print job in step S8 (S8: Yes), compares the distance L1 and the distance L2 in step S1401. The processing unit 71, in a case where the distance L1 is lesser than the distance L2 (i.e., L1<L2), proceeds to step S9 and in a case where the distance L1 is greater than the distance L2 (i.e., L1>L2), proceeds to step S1402.

In step S1402, the processing unit 71 performs some of the printing in a connected state. In other words, the processing unit 71 performs at least the initial printing by the printing unit 2 in relation to the succeeding printing medium SH2 in a state in which the cutter unit 3 and the carriage 22 are connected. After that, the processing unit 71 proceeds to step S9 and then disengages the connection of the cutter unit 3 and the carriage 22 at the standby position of the cutter unit 3.

For example, the processing unit 71, after printing of the first scan by the printing unit 2 was ended, moves the carriage 22 to the standby position WP before moving it to the home position HP2 for printing of the second scan and then disengages the connection with the cutter unit 3. Because the carriage 22, at the point in time when the printing of the first scan was ended, is positioned further in the main scanning +H direction than its home position HP2, the carriage 22 will be positioned closer to the standby position WP of the cutter unit 3 than the home position HP2. Therefore, by causing the connection of the carriage 22 and the cutter unit 3 to disengage as is after the printing of the first scan was ended, the movement distance of the carriage 22 can be made shorter than in a case where the carriage 22, which is positioned at the home position HP2 before the printing of the first scan, is caused to move to the standby position WP. Accordingly, the time that is required for disconnection of the carriage 22 and the cutter unit 3 can be shortened and the throughput of the printing apparatus 1 can be improved.

Note that the timing of disengaging the connection of the cutter unit 3 and the carriage 22 is not limited to after the printing of the first scan by the printing unit 2. For example, disconnection may be performed by identifying from print data a print scan in which the carriage 22 is scanned furthest in the main scanning +H direction in the duration up until the leading edge of the printing medium SH2 reaches the cutting position C. By this, the movement distance of the carriage 22 during disconnection can be made shorter and the throughput of the printing apparatus 1 can be improved.

As described above, by virtue of the present embodiment, the printing apparatus 1 performs some of the printing that is related to the succeeding printing medium S in a state in which the carriage 22 and the cutter unit 3 are connected. By this, the time that is required for disconnection of the carriage 22 and the cutter unit 3 can be shortened and the throughput of the printing apparatus 1 can be improved.

Note that although in the present embodiment, the predetermined condition for performing some of the printing that is related to the succeeding printing medium S in a state in which the carriage 22 and the cutter unit 3 are connected was defined by the relationship of the distance L1 and the distance L2, the determination of whether or not to perform printing in a connected state is not limited to this. For example, when performing high resolution printing or printing in a photograph mode, there are cases where, considering the effect of the vibration of the printhead 21, it is better not to perform printing in a state in which the carriage 22 and the cutter unit 3 are connected. Accordingly, the processing unit 71 may confirm, in addition to the relationship of the distance L1 and the distance L2, whether or not the predetermined condition regarding information that is related to an image to be printed is satisfied and in a case where both are satisfied, may cause the printing unit 2 to perform printing in a connected state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239282, filed Dec. 27, 2019, which is hereby incorporated by reference herein in its entirety.

What is claimed is:

1. A printing apparatus comprising:

a printing unit configured to print an image on a printing medium and configured to be movable in a scanning direction;

a cutter unit configured to connect with or separate from the printing unit, and configured to cut the printing medium by following a movement of the printing unit with the cutter unit connecting with the printing unit;

an acquisition unit configured to acquire a size of the printing medium in the scanning direction; and a processing unit configured to:

(1) set a separation position at which the cutter unit separates from the printing unit in accordance with the size of the printing medium acquired by the acquisition unit before a printing operation for a first print job;

(2) control connecting the cutter unit with the printing unit and cutting the printing medium while the cutter unit is connected with the printing unit in a case in which the printing operation for the first print job is completed; and (3) control separating the cutter unit from the printing unit at the separation position, which is set before the printing operation for the first print job, after cutting the printing medium in a case in which there is a second print job.

2. The printing apparatus according to claim 1, wherein the acquisition unit includes a sensor configured to detect an edge of the printing medium in the scanning direction.

3. The printing apparatus according to claim 1, wherein the processing unit sets the separation position to be apart by a predetermined distance from an edge of the printing medium in the scanning direction.

4. The printing apparatus according to claim 1, wherein a home position of the printing unit is arranged at one end of a movement range of the printing unit, wherein a home position of the cutter unit is arranged at an opposite end from the one end of the movement range of the printing unit, and wherein the processing unit, in a case where the size acquired by the acquisition unit is a first size, sets, as the separation position, a first position at which the cutter unit separates from the printing unit, and in a case where the size acquired by the acquisition unit is smaller than the first size, sets, as the separation position, a second position, at which the cutter unit separates from the printing unit, closer to the home position of the printing unit than the first position.

5. The printing apparatus according to claim 4, wherein the printing unit includes a first member and a second member, wherein the cutter unit includes a third member and a fourth member, wherein the cutter unit, by a contact between the first member and the third member, moves in accordance with a movement of the printing unit in a first direction from the home position of the cutter unit toward the home position of the printing unit, wherein the cutter unit, by a contact between the second member and the fourth member, moves in accordance with a movement of the printing unit in a second direction opposite that of the first direction, and wherein, by the cutter unit moving in the second direction in accordance with a movement of the printing unit, a contact between the first member and the third member is avoided in a case where the printing unit reverses from the second direction to the first direction.

6. The printing apparatus according to claim 4, wherein the cutter unit positions at the first position before a printing operation by the printing unit is started.

7. The printing apparatus according to claim 4, wherein the cutter unit positions at the first position after a printing operation by the printing unit is completed.

8. The printing apparatus according to claim 1, further comprising detection unit configured to detect a position of the cutter unit in the scanning direction.

9. The printing apparatus according to claim 8, further comprising a notification unit configured to notify an error of the cutter unit in a case in which the printing unit and the cutter unit cannot connect to each other in accordance with a result detected by the detection unit.

10. The printing apparatus according to claim 1, wherein the printing unit includes a printhead configured to discharge ink.

11. The printing apparatus according to claim 1, wherein the cutter unit connects with the printing unit by reversing a moving direction of the printing unit.

12. The printing apparatus according to claim 1, wherein the cutter unit separates from the printing unit by reversing a moving direction of the printing unit.

13. The printing apparatus according to claim 1, further comprising a lever member provided with the cutter unit to be pivotable, wherein the cutter unit and the printing unit come into a connected state in a case in which a first member provided with the printing unit contacts to the lever member so that the level member pivots, and wherein the cutter unit and the printing unit come into a separated state in a case in which a second member provided with the printing unit contacts to the lever member so that the lever member pivots.

14. A control method of a printing apparatus, the printing apparatus comprising (a) a printing unit configured to print an image on a printing medium and that is configured to move movable in a scanning direction, and (b) a cutter unit configured to connect with or separate from the printing unit, and configured to cut the printing medium by following a movement of the printing unit with the cutter unit connecting with the printing unit, the method comprising:

acquiring a size of the printing medium in the scanning direction;

setting a separation position at which the cutter unit separates from the printing unit in accordance with the size of the printing medium before a printing operation for a first print job;

connecting the cutter unit with the printing unit and cutting the printing medium while the cutter unit is connected with the printing unit in a case in which the printing operation for the first print job is completed; and separating the cutter unit from the printing unit at the separation position, which is set before the printing operation for the first print job, after cutting the printing medium in a case in which there is a second print job.

15. A printing apparatus comprising:

a printing unit configured to print an image on a printing medium and configured to be movable in a scanning direction;

a cutter unit configured to connect with or separate from the printing unit, and configured to cut the printing medium by following a movement of the printing unit with the cutter unit connecting with the printing unit; and a control circuit including at least one processor and at least one storage device and configured to:

(1) acquire a size of the printing medium in the scanning direction, (2) set a position at which the cutter unit separates from the printing unit in accordance with the size of the printing medium before a printing operation for a first print job, (3) control connecting the cutter unit with the printing unit and cutting the printing medium while the cutter unit is connected with the printing unit in a case in which the printing operation for the first print job is completed, and (4) control separating the cutter unit from the printing at the separation position, which is set before the printing operation for the first print job, after cutting the printing medium in a case in which there is a second print job.

* * * * *